(12) United States Patent
Barnett

(10) Patent No.: US 6,840,468 B2
(45) Date of Patent: Jan. 11, 2005

(54) SALT SHOOTER

(75) Inventor: Wade Charles Barnett, Penn Valley, PA (US)

(73) Assignee: Wade C. Barnett, Penn Valley, PA (US)

( * ) Notice: Subject to any disclaimer, the term of this patent is extended or adjusted under 35 U.S.C. 154(b) by 0 days.

(21) Appl. No.: 09/819,812

(22) Filed: Mar. 29, 2001

(65) Prior Publication Data

US 2002/0139875 A1 Oct. 3, 2002

(51) Int. Cl.[7] .............................................. A01C 15/04
(52) U.S. Cl. ..................... 239/654; 239/152; 239/154; 239/289; 239/653; 239/655; 406/38; 406/99
(58) Field of Search ........................... 239/142, 143, 239/152, 153, 154, 653, 654, 289, 655, 664; 406/38, 98, 136, 139, 102, 146, 99; 222/630, 637, 175, 195, 323, 373; 241/168, 169.1, 187, 48; 252/70; 106/13

(56) References Cited

U.S. PATENT DOCUMENTS

| | | | | | |
|---|---|---|---|---|---|
| 1,666,350 | A | * | 4/1928 | Pitt | 239/653 |
| 3,174,251 | A | * | 3/1965 | West | 239/655 |
| 3,586,215 | A | * | 6/1971 | Roche | 406/102 |
| 3,993,225 | A | * | 11/1976 | Manni | 239/653 |
| 4,071,170 | A | * | 1/1978 | Gunzel et al. | 406/98 |
| 4,089,441 | A | * | 5/1978 | Cole et al. | 239/654 |
| 4,692,259 | A | * | 9/1987 | Roman | 252/70 |
| 5,119,993 | A | * | 6/1992 | Gunzel et al. | 239/654 |
| 5,190,225 | A | * | 3/1993 | Williams | 239/154 |
| 5,392,996 | A | * | 2/1995 | Ussery | 239/654 |
| 5,409,166 | A | * | 4/1995 | Gunzel et al. | 239/142 |
| 5,542,719 | A | | 8/1996 | Nordin | 291/3 |
| 5,638,574 | A | * | 6/1997 | Haupt et al. | 15/330 |
| 5,683,619 | A | * | 11/1997 | Ossian et al. | 252/70 |
| 5,779,161 | A | * | 7/1998 | Dvorak | 239/654 |
| 5,794,864 | A | * | 8/1998 | Hammett et al. | 241/56 |
| 5,964,420 | A | * | 10/1999 | Hampton | 239/142 |
| 6,089,477 | A | * | 7/2000 | Dillon | 239/653 |
| 6,156,227 | A | * | 12/2000 | Koefod | 106/13 |

* cited by examiner

Primary Examiner—Steven J. Ganey
(74) Attorney, Agent, or Firm—Blank Rome LLP

(57) ABSTRACT

A hand-portable spreader blows particles, such as salt or sand, over an outdoor surface to increase friction. The spreader has a grip and accepts an extension cord to power the blower motor. The motor drives a vane impeller mounted in a housing and connected to a nozzle, similar to a leaf blower, but the intake to the impeller is arranged to suck up particles from a storage chamber. The air passes through the particles in the storage area and then through an orifice, where the air stream velocity increases and particles are picked up and levitated up into a conduit that passes to impeller. After passing through the impeller, the particles and air are ejected from a nozzle to scatter the particles over a surface such as a street or sidewalk to melt ice and snow, for use as a friction (anti-slip) agent.

11 Claims, 2 Drawing Sheets

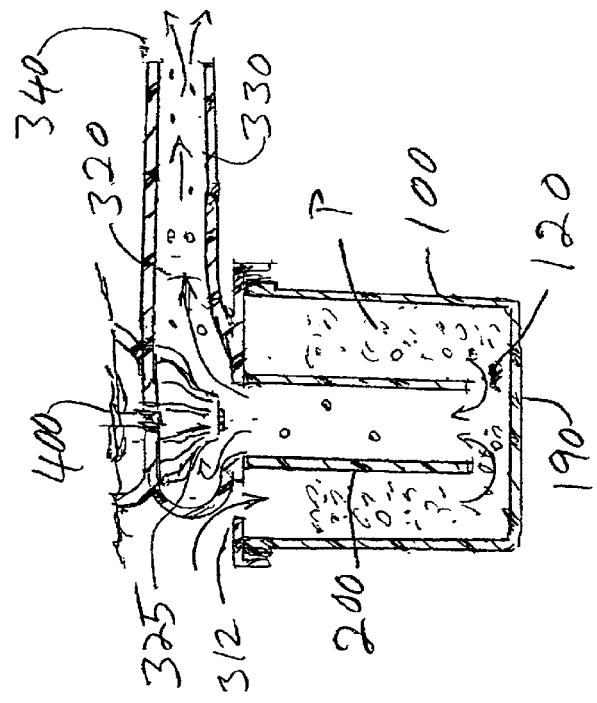
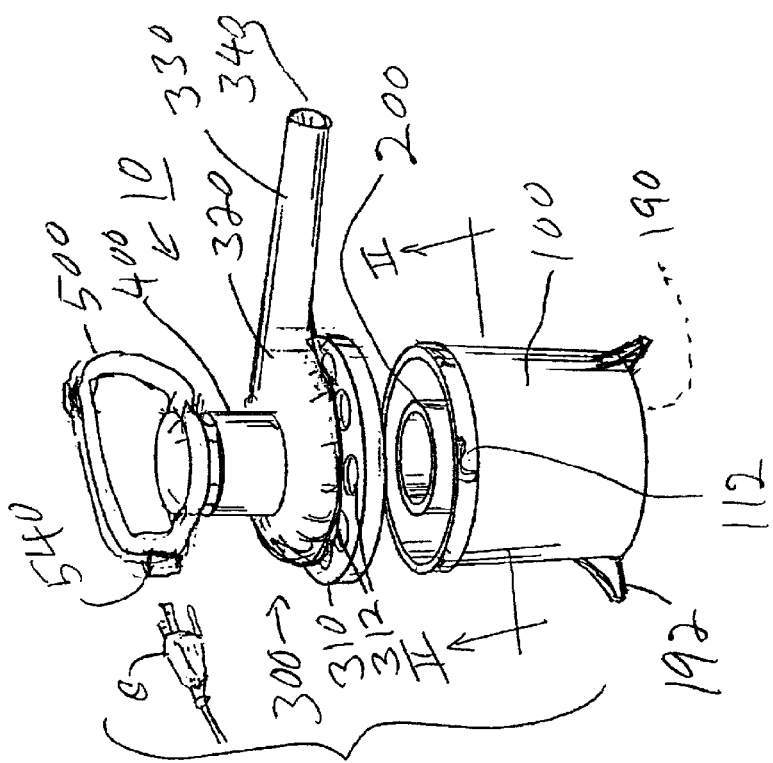
Fig. 1
Fig. 2

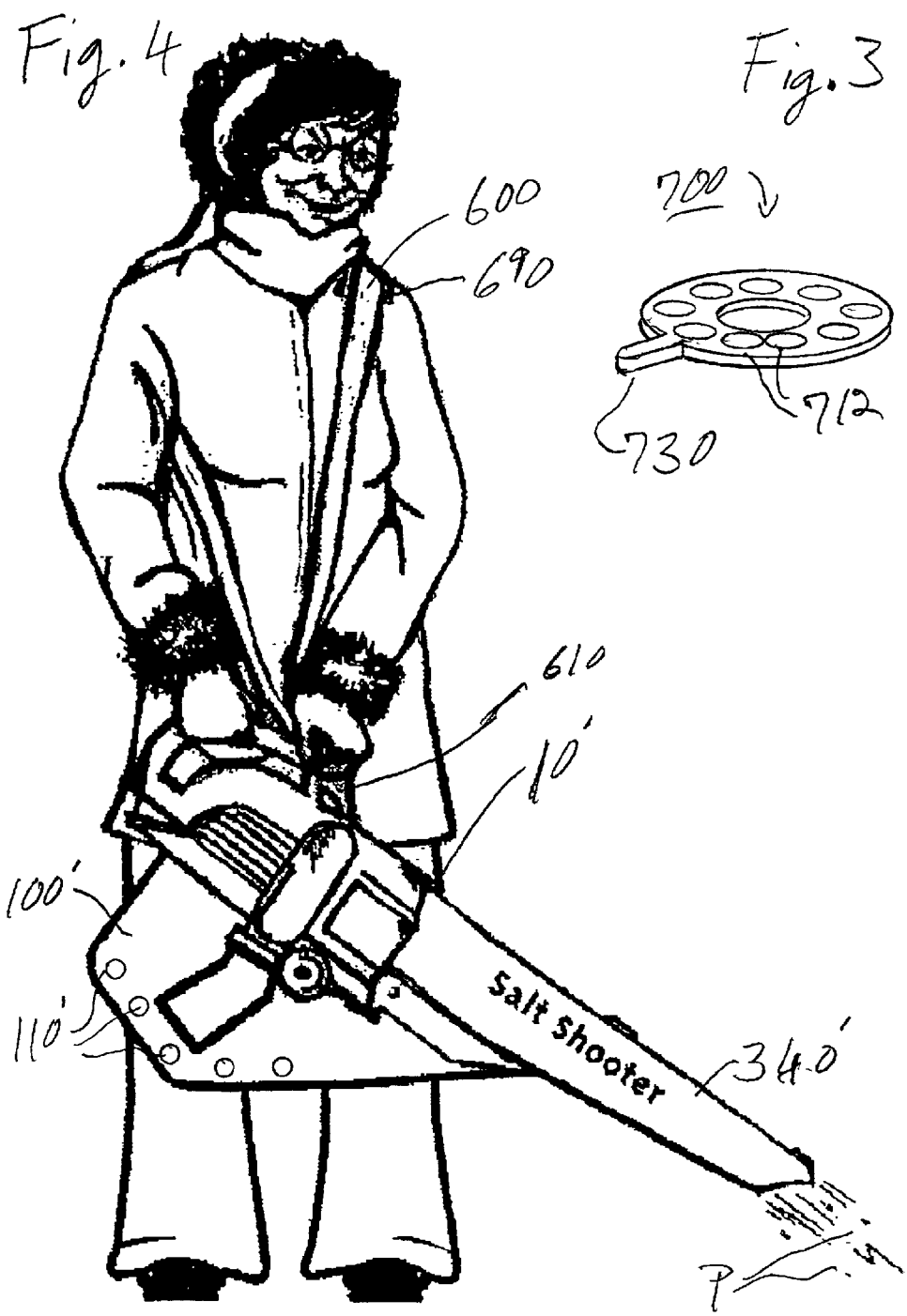

SALT SHOOTER

BACKGROUND OF THE INVENTION

1. Field of the Invention

The present invention relates to devices for spreading salt, sand, and other particles over a surface such as a street or sidewalk to melt ice and snow and for use as a friction (anti-slip) agent.

2. Description of the Prior Art

When snow and ice are problems on streets and highways, trucks spread sand and salt. The trucks usually use a rotating spreader which flings off particles of sand or salt with centrifugal force. Such centrifugal spreaders have a limited range, and are not suitable to be adapted for hand-held use because the rotating member would hit the user's legs and would need to be held away from the body in an awkward and tiring position.

U.S. Pat. No. 5,542,719 to Nordin discloses a stationary sand spreading device which uses pressurized air to drive sand out of a directed nozzle at the bottom of a cylindrical hopper. The air is fed to the tank from a pressure tank at up to 200 psi. Despite the dangerously high pressure, the sand is likely to jam in the nozzle throat because of the walls of the hopper converge toward the nozzle. The Nordin device is not portable, and could not be made so because of the large air tank required, which must be thick and strong-walled to withstand the high pressure.

In order for a spreader to be portable, it must be light; and to be light, it must be supplied with energy from an outside source (for example, through an extension cord) or must carry energy in a form which is light in weight (such as gasoline). However, this is not disclosed in the prior art.

The prior art does not disclose a hand-held or portable sand or salt spreader, nor does it disclose any blower which is adapted to spread salt, absorbent particles, friction agents, or the like.

SUMMURY OF THE INVENTION

The present invention has an object of providing a portable or hand-held device which is capable of broadcasting salt, sand, and other friction-increasing particles over a surface such as a street or sidewalk to prevent slips, falls, or vehicle skids. The spreader of the invention is intended to be, preferably, light enough in weight so that it may be operated while hand-held.

Another object is a portable spreader which can broadcast particles in a wide "shotgun" pattern and includes a base, so that it can sit in stable attitude on a surface and operate without attention to cover a broad area with friction particles.

A further object is a spreader that uses high-speed air to pick up and throw particles of salt, sand, absorbent clay particles such as KITTY LITTER, gravel, or any other type of friction-enhancing particulate, powder or granule, enabling the user to evenly cover a surface with the particles.

The present invention relies on the characteristic of wind to pick and carry particles. A motor and blower are used to generate an air stream that picks up and carries friction particles, which are then blown through a nozzle and spewed out to scatter over the surface to be friction-treated. In a preferred embodiment, the air stream flows at least partially through the particles resting in a storage chamber.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is an exploded perspective view.

FIG. 2 is a partial cross-sectional view on lines II—II of FIG. 1.

FIG. 3 is a perspective view.

FIG. 4 is a perspective view.

DETAILED DESCRIPTION OF THE INVENTION

FIG. 1 shows a preferred embodiment of the present invention, a hand-held or portable spreader 10 that blows particles over a surface (not shown). The spreader 10 is shown separated into a lower part including a conduit 200 and a storage chamber 100, which holds the particles (seen in FIG. 2). The bottom of the storage chamber 190 serves as a stable base, and optionally includes stabilizing feet 192.

Above the storage chamber 100 is an air blower structure 300 including a lid 310, an impeller housing 320 containing an air impeller 325 (seen in FIG. 2), and a second nozzle conduit 330 merging into a nozzle 340. Above the housing 320 is a motor 400 which drives the air impeller 325, preferably by direct drive; a gasoline engine (not shown) is an alternative. A grip 500 is provided, which may include a power connector 540 adapted to mate with an extension cord C.

An on/off switch 550 is preferably mounted on the grip 500. The switch 550 preferably includes a lock or is of childproof design.

A catch 112, on the upper rim of the storage chamber 100, cooperates with a mating catch member on the rim flange of the lid 310 (not visible) to hold the spreader 10 together in the assembled position (seen in FIG. 2).

The lid 310 includes a plurality of holes 312 which admit air to the storage chamber 100 when the lid 310 is secured onto the storage chamber 100.

A flat disk 700, shown in FIG. 3, may be loosely mounted above lid 310 for rotation along the outer walls of conduit 200 to control the intake airflow through lid 310. The disk 700 preferably is equal in size, construction, and dimension to the horizontal portion of lid 310, and perforated with holes 712, identically to the plurality of the holes 312 in lid 310. To vary the airflow, the disk has a small handle 730 in a convenient location along the periphery for the purpose of rotating the disk, and thereby aligning or mis-aligning the holes 712 and 312. This disk will preferably not have any vertical sides as does lid 310.

FIG. 2 shows the path of the air admitted through the holes 312. (Disk 700 is not shown in FIG. 2.) The air passes downward through a mass of particles P loaded into the storage chamber 100, which is seen to be generally shaped as an annulus of a cylinder. Located preferably at the bottom of the storage chamber is an annular gap which serves as an orifice 120.

Preferably, the orifice is generally annular and extends at least partially around the conduit; that is, the orifice may comprise a series of holes or openings disposed along a circumference or portions of a circumference, or, it may comprise an opening in the form of a band or annulus, bordered by two continuous rims passing all the way around or part of the way around the conduit.

The cross sectional area of the orifice is preferably smaller than the cross sectional area of the annular storage chamber 100, so that as air approaches the orifice 120 it speeds up and is able to lift particles P. The central conduit 200 has an internal diameter such that the air stream carries the particles P upward to the air blower, which preferably comprises the vane impeller 325 and impeller housing 320. The vane impeller 325 is preferably of the centrifugal type, and the housing 320 is preferably somewhat spiral in shape. The spiral shape merges internally into a second nozzle conduit 330. The air blower maintains an air stream velocity sufficient to carry the particles P through both conduits 200, 330 and spew them forth.

The vanes of the impeller 325 are preferably curved, so that when the air stream impinges on the vanes of the impeller 325 from an axial direction as illustrated, the particles will ricochet outward and acquire an additional velocity parallel to the air flow.

At the bottom of the conduit 200, a swirling cloud of particles may form. Lighter particles will be selectively drawn upward toward the impeller vanes, leaving larger particles in the bottom of the conduit. These lighter particles have less momentum and will slow down faster in still air than larger particles would, but, they are carried along with the air stream; at first a larger proportion of smaller particles will be shot from the nozzle. As the storage chamber empties, the air stream velocity will increase, due to a shorter air flow path through the particles in the storage chamber and consequent decreased air resistance, and the larger particles will be picked up and shot out. These larger particles will shoot farther due to their higher speed and greater momentum.

An alternative embodiment, which is not presently preferred and is not illustrated, provides a draft gate at the bottom of the conduit 200; if included in the present invention, the any draft gate should be adapted to close. As experimented with, the draft gate caused clumping with rock salt.

It is noted that clumps of rock salt, if drawn from the storage chamber 100 through the conduit 200 by a high velocity air flow, should shatter upon impact with the vanes of the impeller 325. Those clumps would then be sufficiently reduced in size to permit expulsion of residual pieces through nozzles 330 and 340. Impeller 325 is preferably constructed of a material resistant to the corrosive properties of rock salt, and of sufficient strength to reduce larger particles P to a size consistent with efficient distribution through the channels of the present Shooter.

The invention also contemplates an adjustable choke-like device on the end of nozzle 340, or a permanent choke (a nozzle with choke is shown in FIG. 4). If the convergence of a choke is too steep, the clogging behind such a choke-like device is to be anticipated. However, a cone-shaped attachment, slightly reducing the diameter of nozzle 340 and causing accelerated airflow and increased propulsion distance, may be advantageous and is within the scope of the invention.

The vibrations from the impeller and motor help to break up any particle jams at the orifice, thus keeping up a steady particle delivery rate. The present invention may also include mechanisms similar to that of a coal grate, or means for providing additional vibration, to avoid jamming at the orifice.

All parts of the invention that come into contact with the particles P are preferably constructed of corrosion- and abrasion-resistant materials able to resist rock salt, calcium chloride, and similar substances.

FIG. 4 shows an embodiment of the spreader 10' with an alternatively-shaped storage chamber 100' with a slightly choked nozzle 340'. The generally kidney-shaped storage chamber 100' may optionally be made of flaccid material such as fabric, and/or may include air holes 110' analogous to the holes 310 of FIGS. 1–2. Alternatively, the fabric may be porous to the extent that distinct air holes are not needed.

The embodiment of FIG. 4 is preferably lighter than the embodiment of FIGS. 1–3, but is similar in function and general construction.

A removable nylon cloth shoulder strap 600, preferably constructed of 2" wide ballistic nylon, may be affixed to the top of the spreader 10' for use in supporting the combined weight of the invention and loaded particles P. This strap 600 preferably has a 3" wide×8" long shoulder pad 690 through which the strap 600 runs, and which is adjustable along the length of the strap for proper positioning. The overall length of the strap should be adjustable from 48" to 72" in order to accommodate various users of various heights, and to afford the user a wide array of comfort settings.

Preferably, the strap is attached at a point generally above the center of gravity of the spreader 10', for ease of directing the nozzle 340'. Also, the kidney-shaped chamber 100' can be shaped so that remaining particles P will collect in such a manner that the balance of the spreader is maintained.

The strap 600 is preferably affixed to through the use of a brass or nylon spring-loaded catch 610, clipping to a D-ring permanently attached to the spreader 10'. The spring-loaded catch will preferably be similar to those used on soft-sided luggage shoulder straps. Alternatively, the forward end of the strap may be attached to the nozzle 340' by wrapping it once around the shaft of nozzle 340' (not shown), and affixing it to itself through the use of a spring loaded catch, identical to the previously-described end attachment. This forward anchor point can be slid freely along the length of nozzle 340' to the user's comfort.

The strap 600 can also be used with the embodiment of FIGS. 1–3.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A hand-portable spreader for blowing particles with an air stream for melting ice or snow, the spreader comprising:

a grip;

a storage chamber holding particles which melt ice or snow to be spread;

an air blower affixed to the top of the storage chamber for generating an air stream that carries the particles through an air conduit which has an orifice between the storage chamber and the air conduit; and a nozzle downstream of the orifice, from which the air stream and particles shoots;

wherein the air blower has a vane impeller capable of breaking the particles into smaller particles prior to being shot out of the nozzle with the vane impeller including curved vanes that impact the particles to direct the trajectory of the particles out of the nozzle, and a velocity of the air stream in the conduit is sufficient to carry the particles from the orifice to the nozzle and be shot therefrom with the air stream for depositing the particles on ice or snow to be melted.

2. The spreader according to claim 1, wherein at least a portion of the air stream flows through the storage chamber.

3. The spreader according to claim 2, wherein the orifice couples the storage chamber to the conduit and the portion of the air stream flows through the storage chamber and thence the orifice.

4. The spreader according to claim 3, wherein the orifice is generally annular and extends at least partially around the conduit.

5. The spreader according to claim 4, further comprising a base disposed below the grip, whereon the spreader is stably supported, and wherein the conduit is disposed generally vertical in a region of the orifice when the spreader is supported on the base.

6. The spreader according to claim 5, wherein an outside of the storage chamber comprises the base.

7. The spreader according to claim 4, wherein the conduit and the storage chamber are separable as a unit.

8. The spreader according to claim 1, comprising a base disposed below the grip, whereon the spreader is stably supported.

9. The spreader according to claim 1, wherein the air blower comprises a vane impeller capable of breaking the particles into smaller particles prior to being shot out of the nozzle.

10. The spreader according to claim 1, comprising a shoulder strap.

11. The spreader according to claim 1, wherein the particles are salt.

* * * * *